United States Patent [19]

Killion

[11] Patent Number: 4,785,889

[45] Date of Patent: Nov. 22, 1988

[54] TURF CORING TOOL

[76] Inventor: Marvin L. Killion, P.O. Box 180, Gretna, Nebr. 68028

[21] Appl. No.: 95,350

[22] Filed: Sep. 11, 1987

[51] Int. Cl.$^4$ .................. A01B 45/02; F16B 2/04
[52] U.S. Cl. ..................................... 172/22; 172/762; 403/227; 403/277
[58] Field of Search .................. 172/22, 762, 21; 403/227, 277, 248, 249

[56] References Cited

U.S. PATENT DOCUMENTS

| | | | |
|---|---|---|---|
| 2,129,933 | 9/1938 | Hueglin | 403/227 |
| 2,390,168 | 12/1945 | Piot | 403/227 |
| 3,612,920 | 11/1971 | Brown | 172/21 |
| 4,236,582 | 12/1980 | Hastings | 172/22 |
| 4,606,412 | 8/1986 | Classen | 172/22 |

Primary Examiner—Richard J. Johnson

[57] ABSTRACT

A turf coring tool includes a tubular cut out wall section turf coring tine having an upper tubular end for receiving force contained within a socket and having this upper end of the coring tine walls severed with an axial slit from the cut out area, allowing the slit walls to become flexible counter to the axis of the tine. A tube having elastic qualities is placed in the slit section and compressed by a washered screw wrenched into the socket base to allow the distortion of the inserted elastic tube to distort the flexible slit tine walls against the inner walls of the socket. The resultant pressure against the distorted tine walls will allow them to become bound in the socket. Wrenching to relieve the elastic compression will cause the tine to be free and released from socket.

3 Claims, 1 Drawing Sheet

TURF CORING TOOL

BACKGROUND OF THE INVENTION

William R. Brown in U.S. Pat. No. 3,621,920 illustrates spiker rods which may be described as tubular cut out wall section turf coring tines. These coring tines have become successful in the marketplace and when fabricated of thin metal tubing, mechanical aerators utilizing these tines which require less force to accomplish insertion, have greater capacity or are constructed much lighter in weight to enhance the convenience of their use. Many aerators utilize these tines by enclosure of their force receiving upper ends in tubular sockets. Tine removal from socket enclosure is often inconvenient and corrosion or wedging of turf particles between the socket walls and the walls of tubular deposited tines frequently makes tine removal difficult.

Prior art has demonstrated many methods of holding tines in socket containment such as threading tines and screwing them into sockets which impairs the strength of thin tine walls, pining through sockets and tines, drawing a tine flange to its socket base and wedging from outside through the socket walls.

SUMMARY OF THE INVENTION

The primary object of the invention is to provide a turf coring tool utilizing a force imparting socket to contain the novel tubular force receiving end of a cut out wall section coring tine that cannot become wedged in containment by entry of foreign particles or corrosion between the socket and tine walls. A more detailed object is to accomplish the foregoing by parting the socket enclosed tine walls with an axial slit to allow the walls to flex and part from the socket walls for removal. The invention further resides in the provision of an elastic tube inserted in the socket enclosed tine portion that will distort when wrenched toward the socket base and force the tine walls to distort against the socket walls to bind them in socket containment.

These and other objects and advantages of the present invention will become more apparent from the following detailed description when taken in conjunction with the accompanying drawings.

BRIEF DESCRIPTION OF THE DRAWINGS

On the drawings, although various modifications and alternate constructions can be made thereto without departing from the true invention, a preferred embodiment of the invention is illustrated, wherein.

DESCRIPTION OF THE PREFERRED EMBODIMENT

Figure 1:
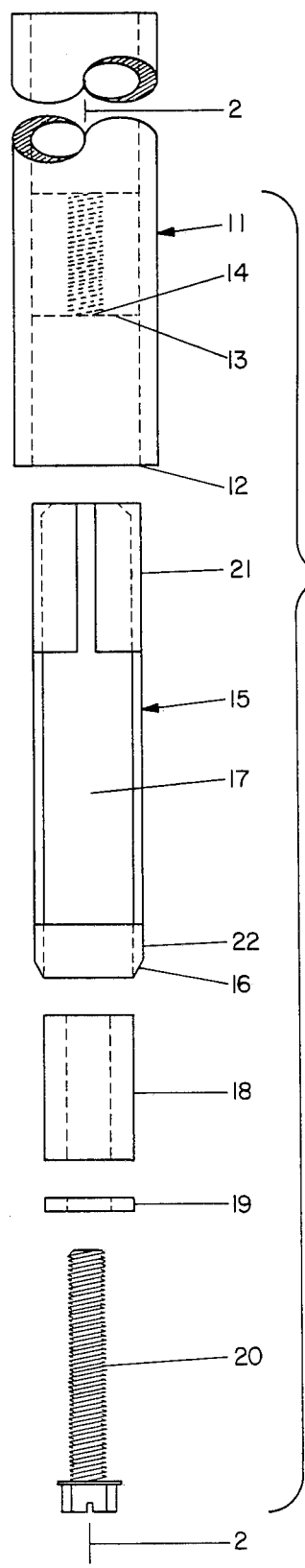
FIG. 1 is an exploded fragmentary rear elevational view of the turf coring tool of this invention.
Figure 2:
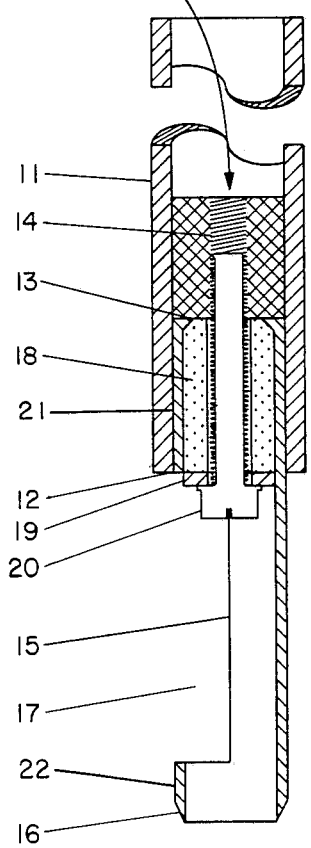
FIG. 2 is a cross section view of the assembled tool taken along line 2—2 in FIG. 1.

Turning now to FIG. 1 of the drawings, there is depicted generally by the numeral 10 the turf coring tool of this invention. The tool includes a socket 11 attached to a force imparting member of a turf aerator (not shown), a coring tine 15, and binding parts, an elastic tube 18, a washer 19 and a threaded screw 20. Upon assembly of these parts by fitting them together in the order of their description and then wrenching the screw to the socket 11, preferably with a screw driver, the most common in availability of all wrenching tools, they become firmly bound together. The convenience of wrenching access through the tubular body eliminates wrenching access problems since the coring tine 15 in all aerators must be withdrawn from the turf surfaces after each core has been made and then is accessible for wrenching by this method. Referring now to the socket 11 (FIGS. 1 and 2) of the turf coring tool 10, it is tubular in shape and the base 13 is an integral part of the socket 11 and has an axial threaded hole 14 through the base 13 and tine entry is allowed through the tubular throat 12. Referring to the turf coring tool 10 (FIG. 1), the turf coring tine 15 retains its full tubular integrity only between the upper edge of the circumferential beveled cutting edge 16 to the commencement of the tubular wall removal area 17 and this tubular section is designated 22 in the drawing. One half of the tubular wall has been removed from the tubular section 22 to the commencement of tubular section for socket disposition 21 and a new and useful improvement in the tubular cut out wall area coring tine 15 is the axial slit in the socket disposition area 21 which allows the remaining tubular walls of area 21 to flex inward for socket installation or outward for binding to the socket 11. The unique flexing of the slit tine walls in area 21 assures that the socket cannot become wedged into socket containment by corrosion or entry of foreign particles between the socket and the tine walls. The elastic tube 18 is also a new and useful improvement to bind the turf coring tine 15 into the socket 11 by wrenching, and is readily understood by the apprentice desiring to install or remove said turf coring tine 15.

I claim:

1. A generally tubular turf coring tool for attachment to a force imparting member of a turf aerator, comprising:
   a generally tubular body portion,
   an intermediate cut-out wall section, a tine securing and force imparting end portion having a longitudinal slit in the tubular wall extending from the end to the cut-out wall section, and an annular turf cutting tip portion.

2. A turf coring tool assembly for attachment to a force imparting member having downwardly opening socket means with a threaded opening therein, said assembly comprising:
   a generally tubular turf coring tine having an intermediate cut-out wall portion and a generally cylindrical longitudinally slit end portion,
   a radially expansible member having an axial bore adapted to be snugly positioned in said tine end portion,
   an elongated threaded member adapted to extend through said bore and into the socket member whereby the tine end portion may be radially expanded into firm engagement with the socket walls.

3. The assembly of claim 2, wherein the expansible member comprises a generally cylindrical resilient member.

* * * * *